(12) United States Patent
Hecht

(10) Patent No.: US 6,485,220 B2
(45) Date of Patent: Nov. 26, 2002

(54) TOOL JOINT

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/833,817

(22) Filed: Apr. 13, 2001

(65) Prior Publication Data

US 2001/0041089 A1 Nov. 15, 2001

(30) Foreign Application Priority Data

May 9, 2000 (IL) .................................................. 136032

(51) Int. Cl.⁷ .............................. F16D 1/00; B25G 3/00; F16B 7/18; B23B 51/02
(52) U.S. Cl. ....................... 403/343; 411/411; 411/436; 408/226; 408/233
(58) Field of Search .................................. 408/226, 233, 408/227, 229, 231; 411/411, 436; 403/343

(56) References Cited

U.S. PATENT DOCUMENTS

| 1,407,335 A | 2/1922 | Reynolds |
| 4,735,537 A | 4/1988 | Rath ............................ 411/411 |
| 5,114,286 A | 5/1992 | Calkins ....................... 408/226 |

Primary Examiner—Christopher J. Novosad
(74) Attorney, Agent, or Firm—Pennie & Edmonds LLP

(57) ABSTRACT

A tool joint comprising a male member a female member. The male member having a coupling portion rearwardly from a body portion. The coupling portion having a frustoconical forward portion and a threaded rear portion. The thread having an intermediate section of uniform depth and terminating in forward and rear end parts. The female member having a bore extending rearwardly from a front surface. The bore having a frustoconical forward portion and a threaded rear portion. The thread having an intermediate section of uniform depth and terminating in forward and rear end parts. Upon threaded coupling of the male and female members to form a tool joint connection, the threaded portion of the male member engages the threaded portion of the female member.

51 Claims, 7 Drawing Sheets

TOOL JOINT

FIELD OF THE INVENTION

The present invention relates to a tool joint employing threaded coupling to be used in particular in cutting tool assemblies employing different heads that are used on a single tool holder.

BACKGROUND OF THE INVENTION

Tool joints with male and female members employing threaded coupling are known in the art. Such a male member usually comprises an external thread portion that matches a corresponding internal thread portion in the female member. An example of such a tool joint coupling mechanism is disclosed in U.S. Pat. No. 5,114,286. As shown in '286, a male coupler (11) is axially aligned with a female coupler (13). The male coupler (11) has a helical male thread (21) which is sized and shaped to match a corresponding helical female thread (23) in the female coupler (13). A disadvantage of the coupling mechanism of the kind described is shown schematically in FIG. 1 (and shown clearly in FIGS. 1 and 5 of '286). It involves the fact that forward to the forward most thread crest 14 of the male member 12 there is formed a narrow neck portion 16 which weakens the forward end of the male member. The term "narrow neck portion" refers, herein, to a section of the male member having a diameter equal to the root diameter of the thread.

Another problem involved with such tool joints relates to the fact that the forward most thread crest, and, also the rear most thread crest, are incomplete, having narrowing runout portions at their open ends. This is clearly shown, for example, in FIG. 2 of U.S. Pat. No. 1,407,335 to Reynolds. Such narrow end portions are too weak to transfer axial loads between the male and female members.

A solution to the problem is disclosed in U.S. Pat. No. 4,735,537 to Rath, which teaches how to reduce the narrow neck portion. In the threaded portion of the male member of '537, the inner end portion of the thread has its full dimension almost to the point where it terminates. This enables the transition section to be made shorter.

It is the object of the present invention to provide a tool joint with male and female members having matching threads in which the threads in both the male member and the female member do not have the conventional runout of incomplete cross-section, thereby providing a shorter and stronger tool joint.

SUMMARY OF THE INVENTION

In accordance with the present invention there is provided a tool joint having an axis A and comprising a male member and a female member;

the male member having an axis B and comprising:
 a male body portion; and
 a male coupling portion projecting rearwardly from the male body portion, the male coupling portion having an unthreaded forward portion adjacent the male body portion and a rear threaded portion terminating at a rear end;
 the threaded portion of the male coupling portion having a thread terminating in a forward end part adjacent the forward portion of the male coupling portion and in a rear end part adjacent the rear end of the rear portion of the male coupling portion, the thread having an intermediate section of uniform depth between the forward and rear end parts;
 the forward end part of the thread of the male coupling portion being a thread root having a variable depth gradually decreasing from a depth equal to the uniform depth of the thread to no depth;
 the rear end part of the thread of the male coupling portion being a thread crest having a variable height gradually decreasing from a height equal to the uniform depth of the thread to no height;

the female member having an axis C and comprising:
 a female body portion; and
 a female coupling portion comprising a bore for accepting the male coupling portion, the bore extending rearwardly from a front surface of the female member towards the female body portion, the bore having an unthreaded forward portion adjacent the front surface and a rear threaded portion terminating adjacent the female body portion;
 the threaded portion of the female coupling portion having a thread terminating in a forward end part adjacent the unthreaded forward portion of the female coupling portion and in a rear end part adjacent the female body portion, the thread of the female coupling portion having an intermediate section between the forward and rear end parts, the thread of the female coupling portion having a depth equal to the uniform depth;
 the forward end part of the thread of the female coupling portion being a thread crest having a variable height gradually decreasing from a height equal to the uniform depth to no height;
 the rear end part of the thread of the female coupling portion being a thread root having a variable depth decreasing from a depth equal to the uniform depth of the thread to no depth;

wherein, upon threaded coupling of the male and female members to form a tool joint connection, the threaded portion of the male member engages the threaded portion of the female member;
 the forward end part of the thread of the male coupling portion and the forward end part of the thread of the female coupling portion have a gap between them of a first angular extent; and
 the rear end part of the thread of the male coupling portion and the rear end part of the thread of the female coupling portion have a gap between them of a second angular extent.

In accordance with a preferred embodiment of the present invention, the male body portion further comprises a rearwardly facing annular shoulder adjacent the unthreaded forward portion of the male coupling member and the front surface of the female member is a forwardly facing annular shoulder; and
 wherein, upon threaded coupling of the male and female members to form a tool joint connection, the annular shoulder of the male body portion abuts the annular shoulder of the female body portion.

Further in accordance with a preferred embodiment of the present invention, the unthreaded forward portion of the male coupling portion is frustoconical in shape, rearwardly tapering towards the rear threaded portion of the male coupling portion and the unthreaded forward portion of the bore of the female coupling portion is frustoconical in shape, rearwardly tapering towards the female body portion; and
 wherein, upon threaded coupling of the male and female members to form a tool joint connection, the unthreaded forward portion of the male coupling portion abuts the unthreaded forward portion of the female coupling portion.

Typically, the first angular extent is in the range of 20° to 90°.

Preferably, the first angular extent is 70°.

Typically, the second angular extent is in the range of 20° to 90°.

Preferably, the second angular extent is 70°.

In accordance with the present invention, the forward and rear end parts of the male and female threaded portions each have an angular extent in the range of 5° to 30°.

Preferably, the forward and rear end parts of the male and female threaded portions each have an angular extent of 15°.

Typically, the male member is made of cemented carbide and the female member is made of steel.

In accordance with the present invention, during the threaded coupling of the male and female members the unthreaded forward portion of the male coupling member abuts the unthreaded forward portion of the female coupling member before the annular shoulder of the male body portion abuts the annular shoulder of the female body portion.

Preferably, when the unthreaded forward portion of the male coupling portion comes into initial contact with the unthreaded forward portion of the female coupling portion the annular shoulder of the male body portion is spaced a distance L from the annular shoulder of the female body portion.

Typically, the distance L lies in the range of 0.1 to 0.6 mm.

In accordance with a preferred embodiment of the present invention, the distance L equals to 0.3 mm.

In accordance with a preferred embodiment of the present invention, the annular shoulder of the male body portion and the annular shoulder of the female body portion are perpendicular to the axis A.

Typically, the annular shoulder of the male body portion and the annular shoulder of the female body portion are ground.

Further typically, the unthreaded forward portion of the male coupling portion and the unthreaded forward portion of the female coupling portion are ground.

Still further typically, the thread portion of the male member is ground.

Preferably, the unthreaded forward portion of the male coupling portion taper at an angle α1 with respect to the axis B, the unthreaded forward portion of the female coupling portion taper at an angle α2 with respect to the axis C, the angle α1 being equal to the angle α2.

Typically, the angles α1 and α2 are in the range of 2.5° to 3.5°.

Further typically, the angles α1 and α2 are 3°.

Optionally, the angle α1 is greater than the angle α2 by 0.25°.

In accordance with a preferred embodiment, the thread portion of the male member and the thread portion of the female member are a single lead threads.

BRIEF DESCRIPTION OF THE DRAWINGS

For a better understanding of the present invention and to show how the same may be carried out in practice, reference will now be made to the accompanying drawings, in which:

In another aspect, the present invention is directed to a male member and a female member, each having an associated inventive threading, the male member and the female member together forming the tool joint.

In yet another aspect, the present invention is directed to a tool assembly having the inventive threading of the present invention, and to a cutting head and a tool shank which together form the tool assembly, the cutting head and the tool shank each having an associated inventive threading.

Figure 1:
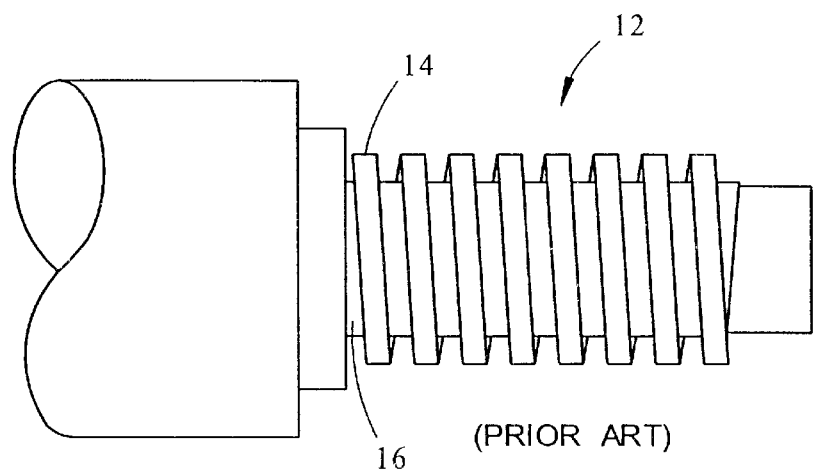
Figure 2:
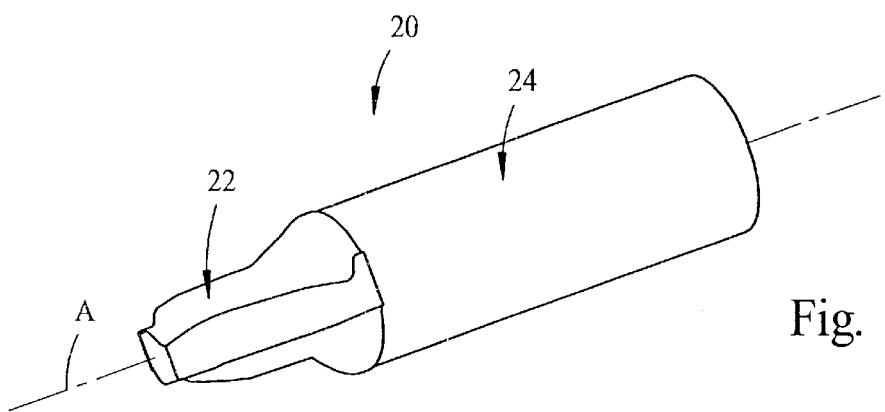
Figure 3:
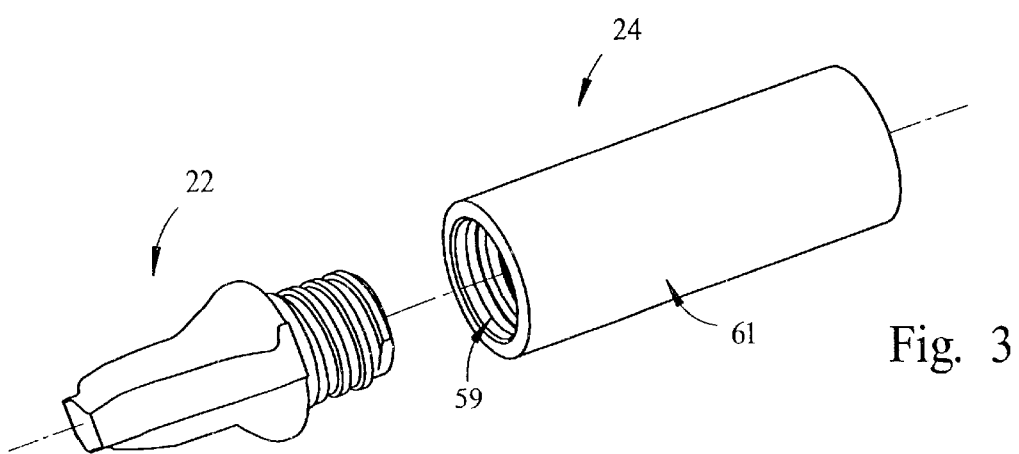
Figure 4:
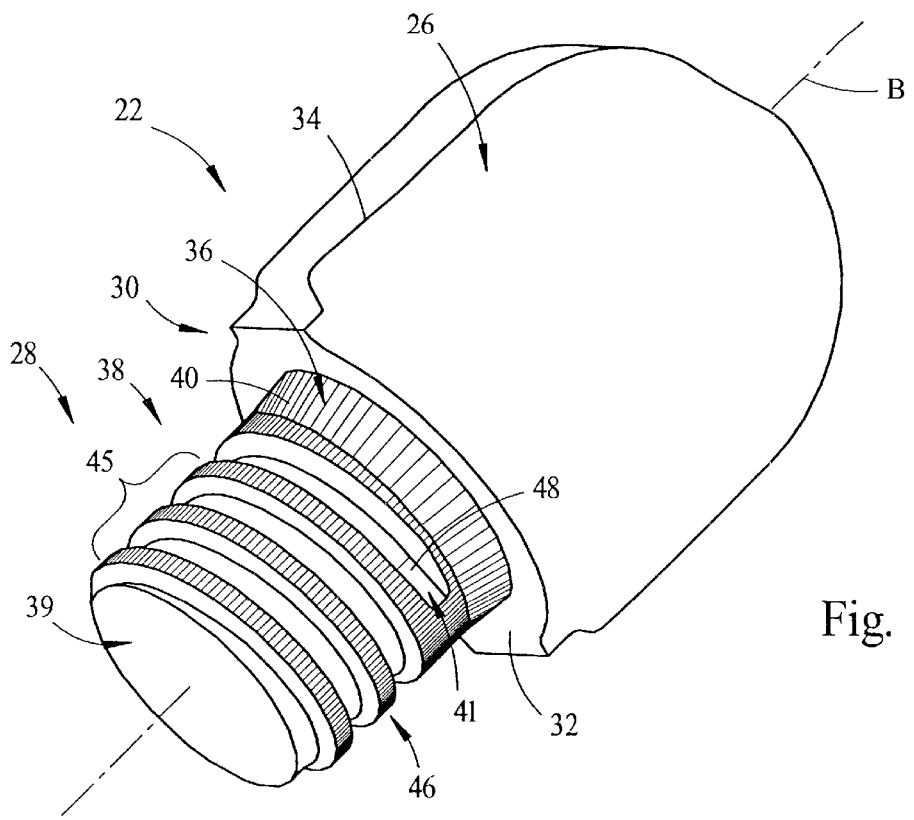
Figure 5:
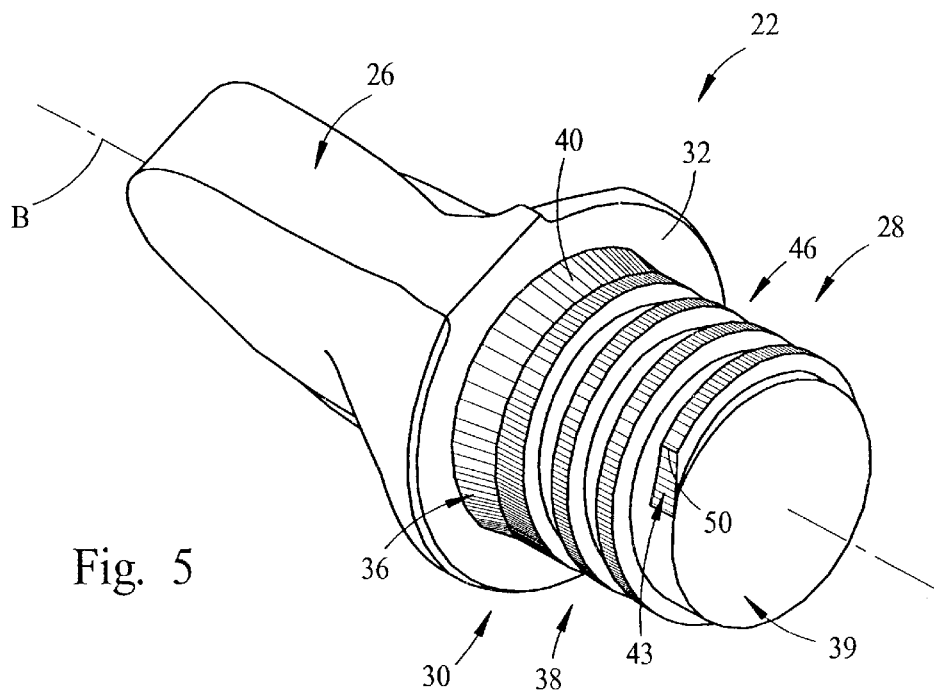
Figure 6:
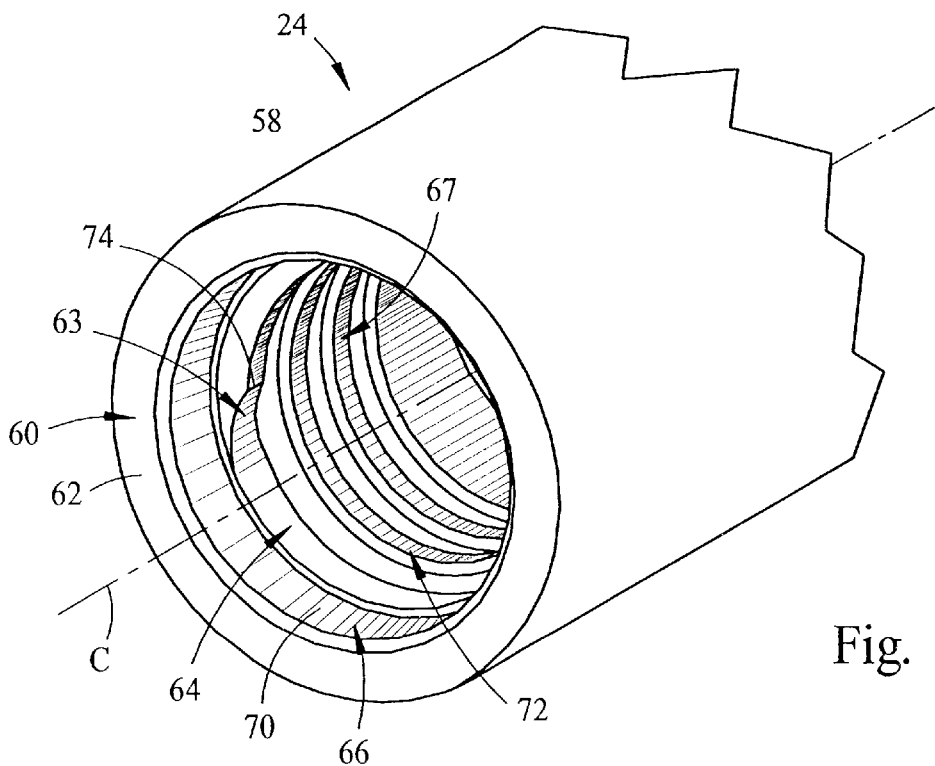
Figure 7:
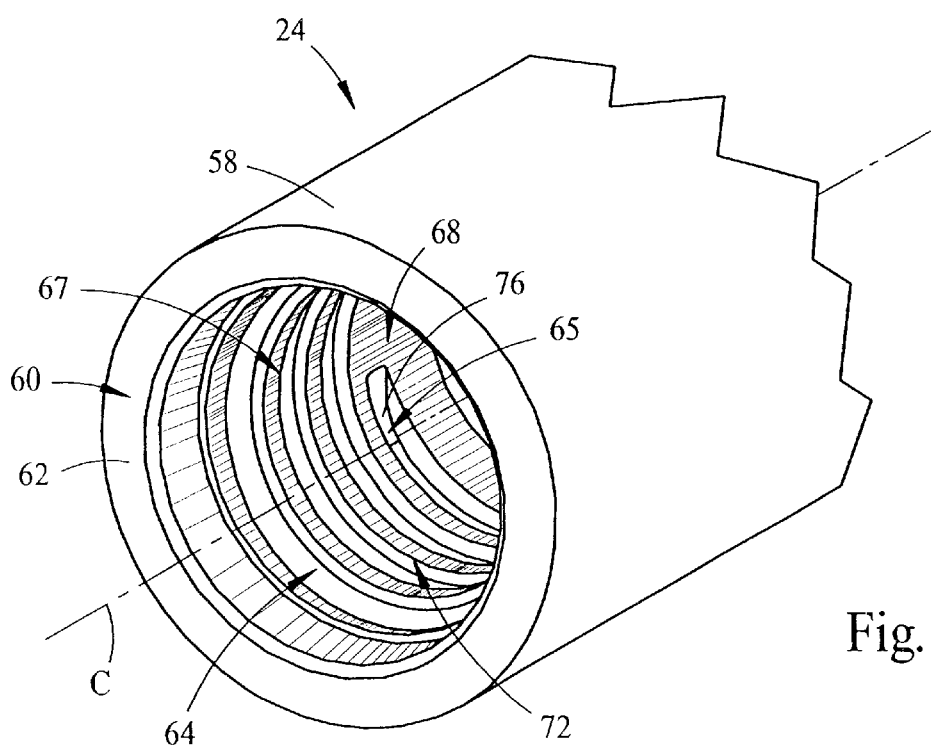
Figure 8:
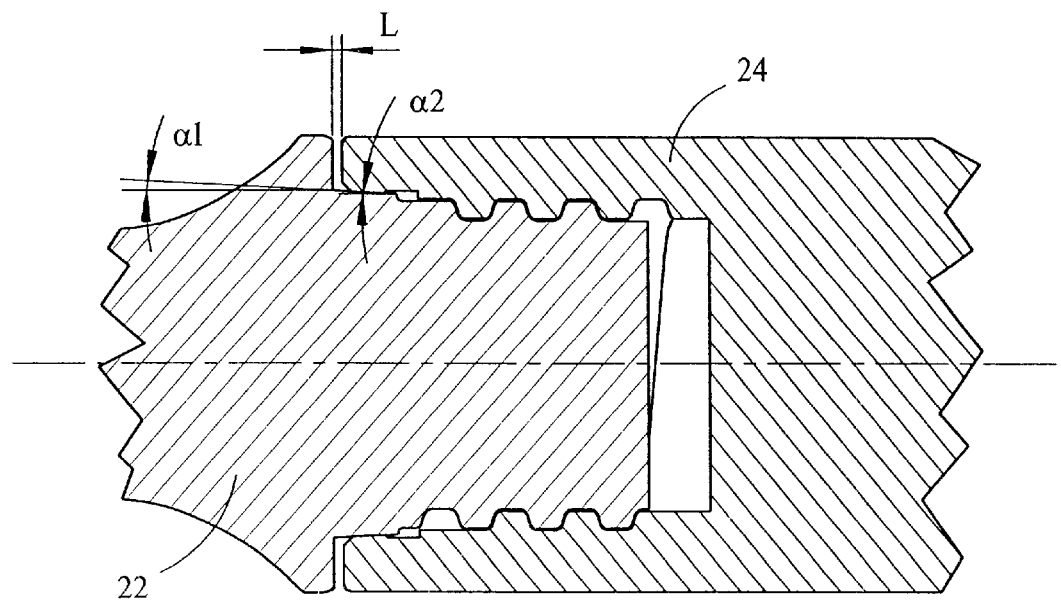
Figure 9:
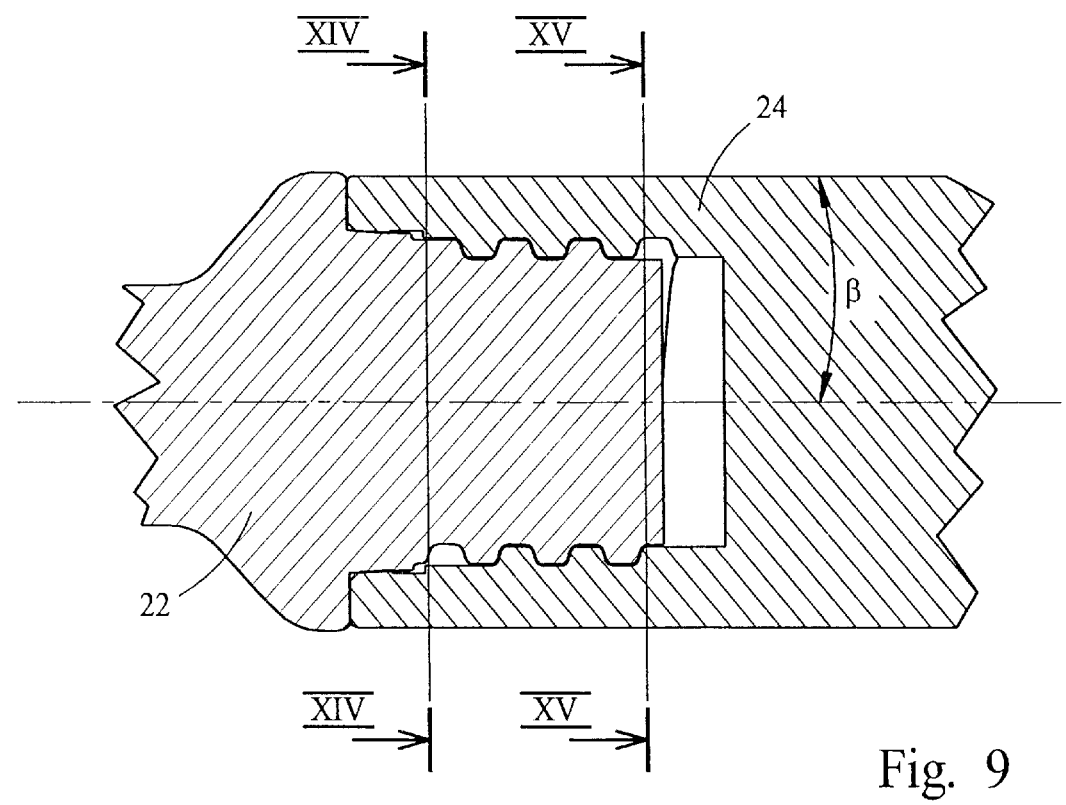
Figure 10:
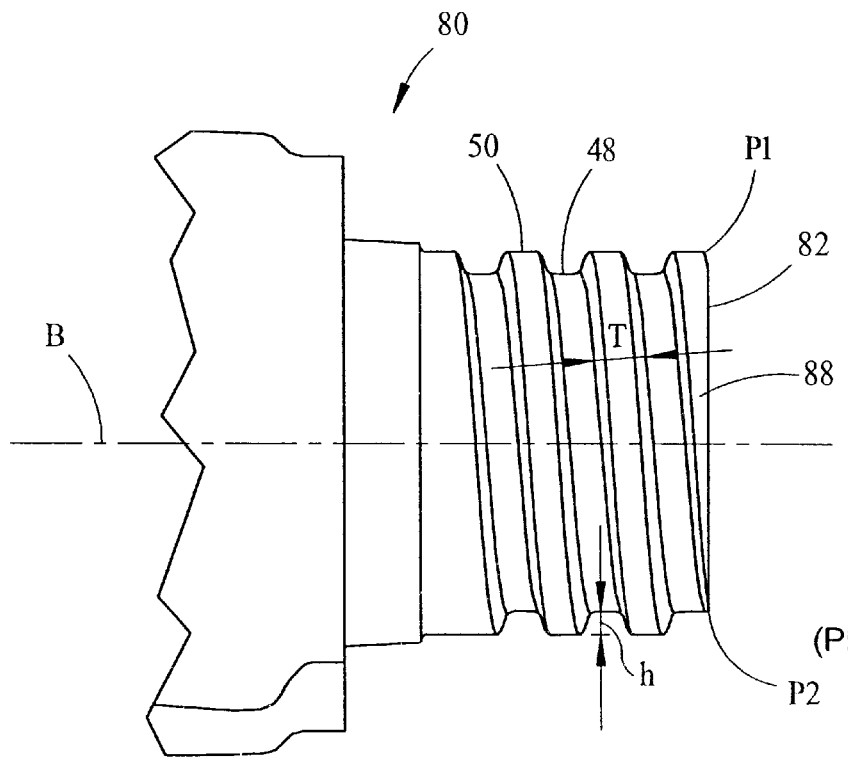
Figure 11:
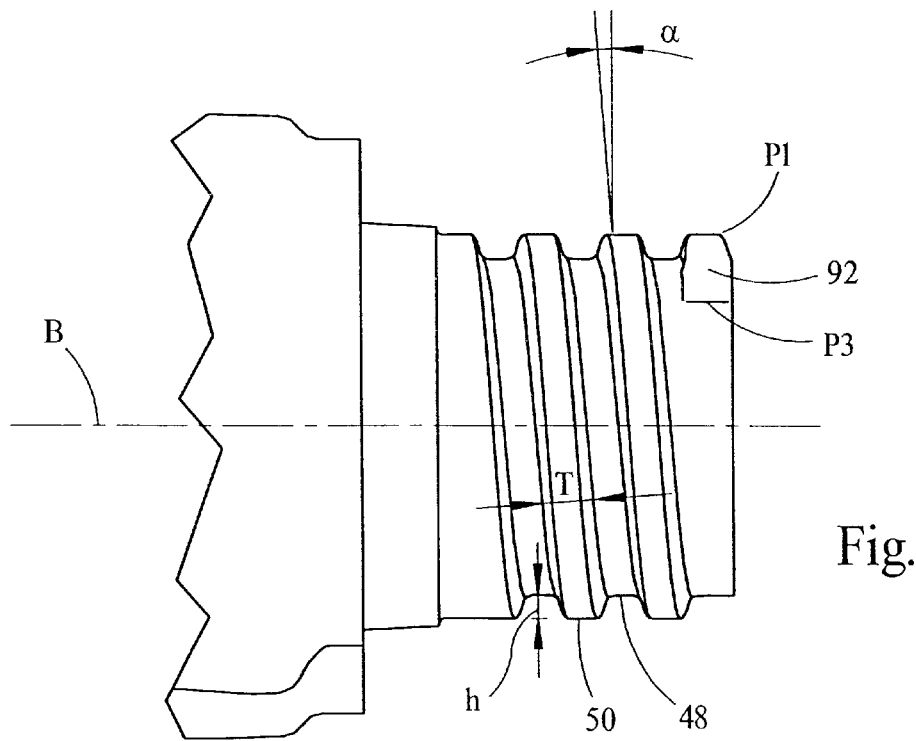
Figure 12:
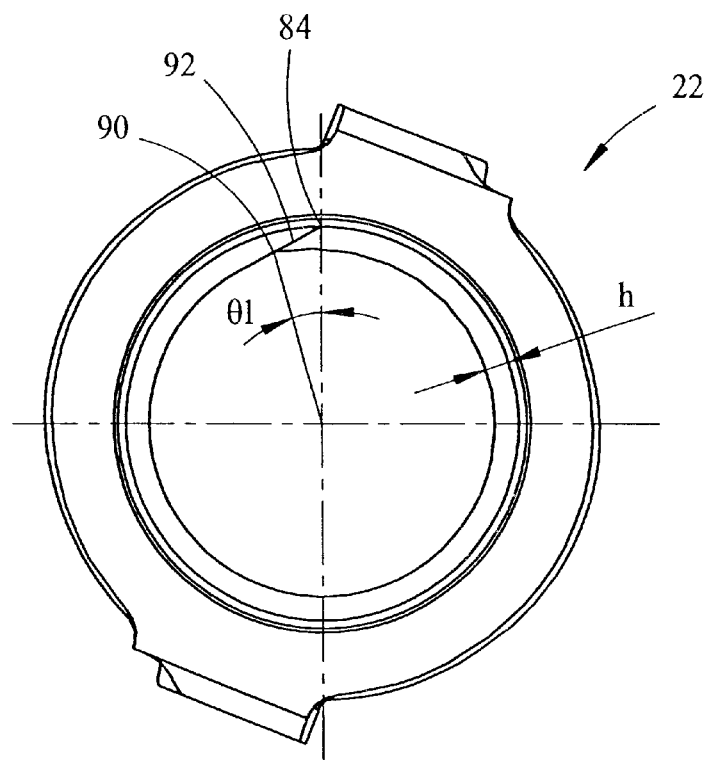
Figure 13:
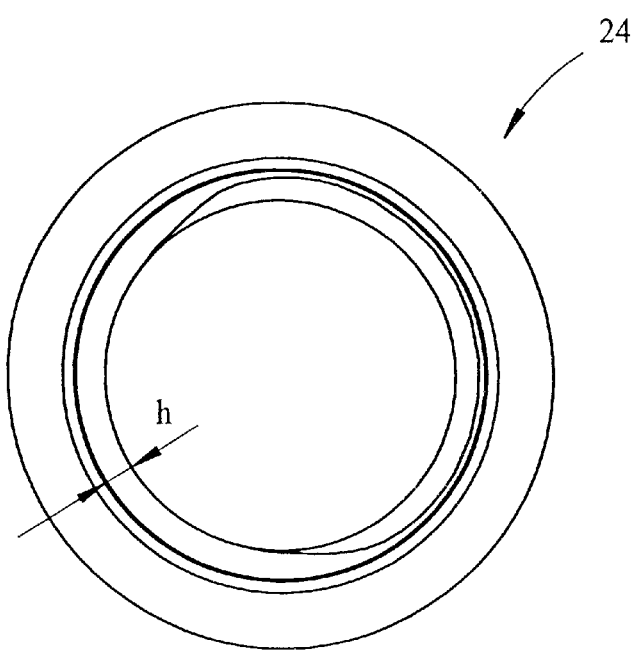
Figure 14:
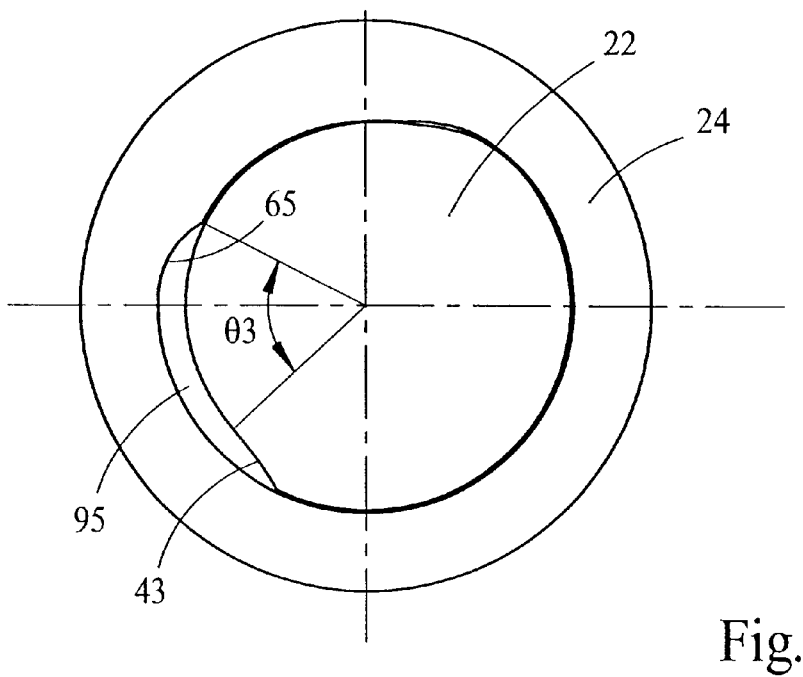
Figure 15:
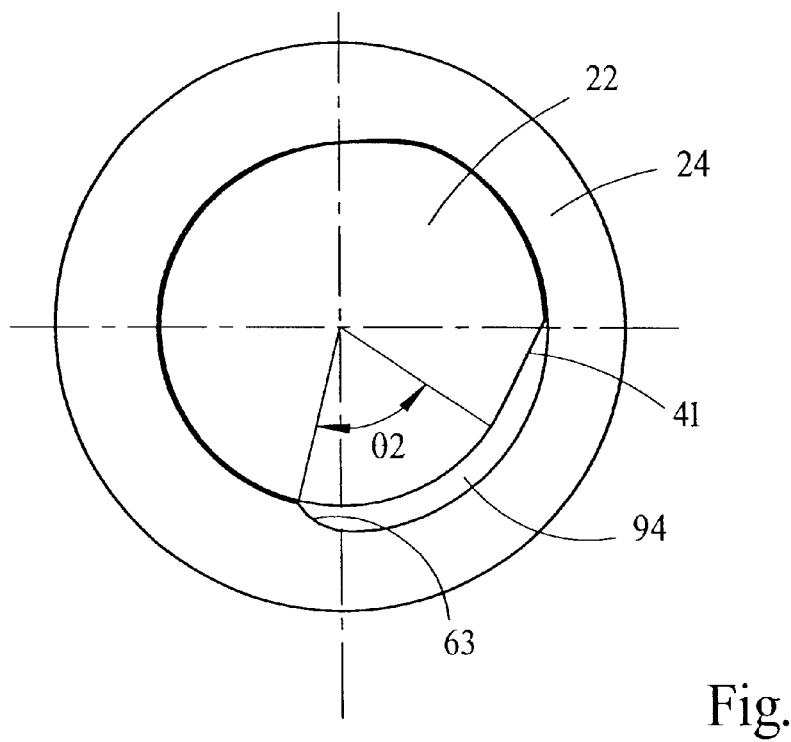

FIG. 1 is a side view of a male member of a prior art coupling mechanism;

FIG. 2 is a perspective view of a cutting tool employing a tool joint according to the present invention;

FIG. 3 is an exploded view of the cutting tool of FIG. 2;

FIG. 4 is a perspective view of the male member of FIG. 3 showing the forward end part of the thread;

FIG. 5 is a perspective view of the male member of FIG. 3 showing the rear end part of the thread;

FIG. 6 is a partial perspective view of the female member of FIG. 3 showing the forward end part of the thread;

FIG. 7 is a partial perspective view of the female member of FIG. 3 showing the rear end part of the thread;

FIG. 8 is a cross-sectional view taken in a plane passing through the axis A of the male and the female members when the unthreaded forward portion of the male coupling portion comes into initial contact with the unthreaded forward portion of the female coupling portion;

FIG. 9 is a cross-sectional view of the tool joint of FIG. 2 taken in a plane passing through the axis A;

FIG. 10 is a partial side view of a male member with a thread according to prior art;

FIG. 11 is a partial side view of a male member with a thread according to the present invention;

FIG. 12 is a rear view of the male member shown in FIG. 3;

FIG. 13 is a front view of the female member shown in FIG. 3;

FIG. 14 is a cross-sectional view of the male member engaged with the female member taken in a plane XIV—XIV in FIG. 9; and FIG. 15 is a cross-sectional view of the male member engaged with the female member taken in a plane XV—XV in FIG. 9.

DETAILED DESCRIPTION OF THE INVENTION

Attention is drawn to FIGS. 2 to 11. As shown, a tool joint 20 having a longitudinal axis A comprises a male member 22 and a female member 24. According to a specific application of the present invention, the tool joint 20 constitutes a cutting tool assembly where the male member 22 is made of cemented carbide and constitutes a cutting head and the female member 24 is made of tools steel and constitutes a holding shank.

The male member 22 has a longitudinal axis B, a body portion 26 and a coupling portion 28 projecting rearwardly from the rear end 30 of the body portion 26. The structure of the body portion 26 is not described since it is not an essential feature of the present invention and it can be of any desired shape. The rear end 30 of the body portion 26 comprises a rearwardly facing annular shoulder surface 32. The rearwardly facing annular shoulder 32 has rotational symmetry about the axis B, and is perpendicular thereto.

The coupling portion 28 has an unthreaded forward portion 36, adjacent the male body portion 26, and a rear threaded portion 38 terminating at a rear end 39. The unthreaded forward portion 36 of the male coupling portion comprises a frustoconical surface 40 that is rearwardly tapering towards the rear threaded portion 38 and is slanted at an angle α1 with respect to the axis B. The angle α1 is typically in the range of 2.5° to 3.5°. According to a preferred embodiment of the present invention, the angle α1 is 3°.

The rear threaded portion 38 of the coupling portion 28 has a thread 46 terminating in a forward end part 41 adjacent the forward portion 36 of the male coupling portion 28 and in a rear end part 43 adjacent the rear end 39 of the rear portion 38 of the male coupling portion 28. The thread 46 has an intermediate section 45 of uniform depth between the forward end part 41 and the rear end part 43. Similarly, the intermediate section 45 has a uniform height h, which is equal to the uniform depth and which is defined as the radial difference between the crest and the root of the thread. The thread 46 has a lead angle $\alpha$ measured with respect to a plane perpendicular to the axis B. Typically, the lead angle is in the range of 4° to 5°. The thread 46 has a trapeze cross-sectional shape with rounded edges. In order to avoid a narrow neck portion adjacent the forward portion 36 of the male coupling portion 28 thereby weakening the male member 22, the forward end part 41 of the thread 46 is, as best seen in FIGS. 4 and 5, a thread root 48 having a variable depth gradually decreasing from a depth equal to the uniform depth of the thread to no depth. Similarly, the rear end part 43 of the thread 46 is a thread crest 50 having a variable height gradually decreasing from a height equal to the uniform depth of the thread to no height.

A further thread property of relevance to the present invention is thread thickness T. The thread thickness T is defined herein as the maximum thickness of a crest measured along a line making an angle $\alpha$ with the axis B.

FIG. 10 shows a prior art thread on a male body 80. The thickness of the thread is constant up to a point P1 where the thread reaches the rear end 82 of the male body 80. From the point defined P1, the thickness T of the thread gradually decreases till it becomes zero at the point P2. The portion 88 of the thread between points P1 and P2, having a height h along a major part thereof, cannot be regarded as an effective thread and since it is an incomplete thread it cannot adequately transfer load as can the complete thread. The portion 88 usually has an angular extent $\theta$ (not shown) as viewed in an end view of the thread that, for commonly used lead angles, is in the range of 120° to 270°. Concerning the terms "effective thread", "incomplete thread" and "complete thread", reference is made to "Machinery's Handbook 25 twenty fifth edition", 1996, Industrial Press Inc., New York, pp. 1631–1634.

Despite the fact that the portion 88 cannot transfer load as the rest of the complete thread, and, therefore, it is unnecessary, it still has a height h along a major part thereof. This means, that when the male body 80 is engaged within a corresponding female body (not shown), a proper female thread must be left for receiving the portion 88. Such a female thread, that does not transfer load is also unnecessary and weakens the female body.

In order to overcome the aforementioned disadvantages, the thread in accordance with the present invention is, as shown in FIG. 11, produced without the portion 88. From the point P1, on the crest 50, the thread gradually decreases to the point P3 through an intermediate portion 92. The point 90 is distanced from the axis B the same distance as the root 48 does. Usually, the intermediate portion 92 has an angular extent $\theta 1$ of less than 30°, and typically having the value of 15°. According to a preferred embodiment of the present invention the male member is made of cemented carbide and the thread is produced by grinding. The angular extent $\theta 1$ of the intermediate portion 92 is determined by the radius of the grinding wheel used.

The principle described above, with the respective changes that have to be made, is applied to both ends of the threads in the male and female members of the invention.

According to a preferred embodiment of the present invention, the rearwardly facing annular shoulder 32, the frustoconical surface 40 and the thread 46 are ground.

The female member 24 has a longitudinal axis C, a side peripheral surface 58 and a front surface 60 connected to the side peripheral surface 58. The front surface 60 has a ring shaped axially directed abutment surface 62 that has rotational symmetry about the axis C and is perpendicular thereto.

A bore 64 extends rearwardly from the front surface 60. The bore 64 constitutes a coupling portion 59 of the female member and is forward to a female body portion 61. The bore 64 has a forward portion 66 and a rear portion 68. The forward portion 66 comprises a frustoconical surface 70 rearwardly tapering towards the female body portion 61 and slanted at an angle $\alpha 2$ with respect to the axis C. The angle $\alpha 2$ is in the range of 2.5° to 3.5°. According to the present invention, the angle $\alpha 2$ is preferably 3°. The rear portion 68 has a thread 72. The thread 72 has a trapeze cross-sectional shape with rounded-edges that mates with the thread 46 of the male member. The thread 72 terminating in a forward end part 63 adjacent the forward portion 66 of the female coupling portion 59 and in a rear end part 65 adjacent the female body portion 61. The thread 72 has an intermediate section 67 of uniform depth between the forward end part 63 and the rear end part 65. The thread 72 has a lead angle $\alpha$ the same as the lead angle of the thread 46 of the male member. As best seen in FIGS. 6 and 7, the forward end part 63 of the thread 72 is a thread crest 74 having a variable height gradually decreasing from a height equal to the uniform depth of the thread to no height. The rear end part 65 of the thread 72 is a thread root 76 having a variable depth gradually decreasing from a depth equal to the uniform depth of the thread to no depth.

In order to assemble the tool joint the male member 22 is mounted in the female member 24 and rotated relative thereto with the male thread 46 engaging the female thread 72. The male thread 46 and the female thread 72 freely turn until the frustoconical surface 40 comes into initial contact with the frustoconical surface 70. In this position, the rearwardly facing annular shoulder surface 32 is spaced a distance L from the abutment surface 62 (see FIG. 8). The length L is typically in he range of 0.1 mm to 0.6 mm. According to a preferred embodiment of the present invention, the length L equals 0.3 mm.

According to one embodiment of the present invention, the slant angle $\alpha 1$ of the frustoconical surface 40 is equal to the slant angle $\alpha 2$ of the frustoconical surface 70. Thus, it is ensured that both frustoconical surfaces 40 and 70 come into full contact with each other. According to another embodiment of the present invention, the slant angle $\alpha 1$ of the frustoconical surface 40 is greater than the slant angle $\alpha 2$ of the frustoconical surface 70 by 0.25°. In accordance with this embodiment it is ensured that the initial contact between both frustoconical surfaces 40 and 70 is made at their front portions thereby increasing the rigidity of the tool joint in the forward connection portion between the male member 22 and the female member 24 near the shoulder surface 32 and the abutment surface 62.

Following the initial contact between the frustoconical surfaces, the male member 22 is forcibly tightened against the female member 24 till the distance L is reduced to zero and the annular shoulder 32 of the male member abuts the abutment surface 62 of the female member. By bringing into abutment the two surfaces 32 and 62, the frustoconical surface 40 of the male member causes a small radially outwardly deformation of the frustoconical surface 70 of the female member. The deformation is enabled due to the relative thinness of the wall of the female member in the region of the frustoconical surface 70.

When the male member is fully engaged with the female member, the axes A, B and C overlap, the forward end part 41 of the thread of the male coupling portion and the forward end part 63 of the thread of the female coupling portion have a gap 94 between them of a first angular extent θ2. Also, the rear end part 43 of the thread of the male coupling portion and the rear end part 65 of the thread of the female coupling portion have a gap 95 between them of a second angular extent θ3. The design of the threads ensures that the angular extent θ2 and the angular extent θ3 are both less than 90°, hence ensuring a strong and rigid engagement without having a relatively weak cross-section. Typically, the first and the second angular extents are in the range of 20° to 90°. Preferably, the first and the second angular extents are 70°.

The abutment between the surfaces 32 and 62 ensures rigidity in the periphery of the contact area between the male and female members. The abutment between the frustoconical surfaces 40 and 70 ensures concentricity between the male and the female members, and, furthermore, it carries a substantial part of the torque applied by the female member to the male member during a cutting operation. The special design of the full engagement between the threads of the male member and the female member eliminates relatively weak cross-sections thus increasing the entire strength of the tool joint.

The tool joint in accordance with the present invention is used for cutting tools having a cutting head diameter in the range of 6 to 20 mm. If desired, for increasing the rigidity of the cutting tool, the side peripheral surface of the body portion of the female member tapers forwardly at an acute angle β with respect to the axis C, the angle β being typically in the range of 0° to 5°. When it is desired, for example, to machine walls of deep pockets, the side peripheral surface 58 of the female member is made cylindrical having a diameter smaller than the diameter of the periphery 34 of the body portion of the male member, thereby, the machining depth is not limited by the holding shank.

It is understood that the tool joint of the cutting tool assembly described above is not restricted to a cutting head and a holding shank. For example, the tool joint can be used as an extension of any two mating parts constituting male and female members.

Although the present invention has been described to a certain degree of particularity, it should be understood that various alterations and modifications could be made without departing from the spirit or scope of the invention as hereinafter claimed.

What is claimed is:

1. A tool joint having an axis A and comprising a male member and a female member;

the male member having an axis B and comprising:
  a male body portion; and
  a male coupling portion projecting rearwardly from the male body portion, the male coupling portion having an unthreaded forward portion adjacent the male body portion and a rear threaded portion terminating at a rear end;
  the threaded portion of the male coupling portion having a thread terminating in a forward end part adjacent the forward portion of the male coupling portion and in a rear end part adjacent the rear end of the rear portion of the male coupling portion, the thread having an intermediate section of uniform depth between the forward and rear end parts;
  the forward end part of the thread of the male coupling portion being a thread root having a variable depth gradually decreasing from a depth equal to the uniform depth of the thread to no depth;
  the rear end part of the thread of the male coupling portion being a thread crest having a variable height gradually decreasing from a height equal to the uniform depth of the thread to no height;

the female member having an axis C and comprising:
  a female body portion; and
  a female coupling portion comprising a bore for accepting the male coupling portion, the bore extending rearwardly from a front surface of the female member towards the female body portion, the bore having an unthreaded forward portion adjacent the front surface and a rear threaded portion terminating adjacent the female body portion;
  the threaded portion of the female coupling portion having a thread terminating in a forward end part adjacent the unthreaded forward portion of the female coupling portion and in a rear end part adjacent the female body portion, the thread of the female coupling portion having an intermediate section between the forward and rear end parts, the thread of the intermediate section of the female coupling portion having a depth equal to the uniform depth;
  the forward end part of the thread of the female coupling portion being a thread crest having a variable height gradually decreasing from a height equal to the uniform depth to no height;
  the rear end part of the thread of the female coupling portion being a thread root having a variable depth decreasing from a depth equal to the uniform depth of the thread to no depth;

wherein, upon threaded coupling of the male and female members to form a tool joint connection, the threaded portion of the male member engages the threaded portion of the female member;
the forward end part of the thread of the male coupling portion and the forward end part of the thread of the female coupling portion have a gap between them of a first angular extent (θ2); and
the rear end part of the thread of the male coupling portion and the rear end part of the thread of the female coupling portion have a gap between them of a second angular extent (θ3).

2. A tool joint according to claim 1, wherein the male body portion further comprises a rearwardly facing annular shoulder adjacent the unthreaded forward portion of the male coupling member and the front surface of the female member is a forwardly facing annular shoulder; and
wherein, upon threaded coupling of the male and female members to form a tool joint connection, the annular shoulder of the male body portion abuts the annular shoulder of the female body portion.

3. A tool joint according to claim 2, wherein during the threaded coupling of the male and female members the unthreaded forward portion of the male coupling member abuts the unthreaded forward portion of the female coupling member before the annular shoulder of the male body portion abuts the annular shoulder of the female body portion.

4. A tool joint according to claim 3, wherein when the unthreaded forward portion of the male coupling portion comes into initial contact with the unthreaded forward portion of the female coupling portion the annular shoulder of the male body portion is spaced a distance (L) from the annular shoulder of the female body portion.

5. A tool joint according to claim 4, wherein the distance (L) lies in the range of 0.1 to 0.6 mm.

6. A tool joint according to claim 5, wherein the distance (L) equals to 0.3 mm.

7. A tool joint according to claim 2, wherein the annular shoulder of the male body portion and the annular shoulder of the female body portion are perpendicular to the axis (A).

8. A tool joint according to claim 2, wherein the annular shoulder of the male body portion and the annular shoulder of the female body portion are ground.

9. A tool joint according to claim 2, wherein the unthreaded forward portion of the male coupling portion and the unthreaded forward portion of the female coupling portion are ground.

10. A tool joint according to claim 1, wherein the unthreaded forward portion of the male coupling portion is frustoconical in shape, rearwardly tapering towards the rear threaded portion of the male coupling portion and the unthreaded forward portion of the bore of the female coupling portion is frustoconical in shape, rearwardly tapering towards the female body portion; and wherein, upon threaded coupling of the male and female members to form a tool joint connection, the unthreaded forward portion of the male coupling portion abuts the unthreaded forward portion of the female coupling portion.

11. A tool joint according to claim 10, wherein the unthreaded forward portion of the male coupling portion taper at an angle (α1) with respect to the axis (B), the unthreaded forward portion of the female coupling portion taper at an angle (α2) with respect to the axis C, the angle (α1) being equal to the angle (α2).

12. A tool joint according to claim 11, wherein the angles (α1) and (α2) are in the range of 2.5° to 3.5°.

13. A tool joint according to claim 12, wherein the angles (α1) and (α2) are 3°.

14. A tool joint according to claim 11, wherein the angle (α1) is greater than the angle (α2) by 0.25°.

15. A tool joint according to claim 1, wherein the first angular extent is in the range of 20° to 90°.

16. A tool joint according to claim 15, wherein the first angular extent is 70°.

17. A tool joint according to claim 1, wherein the second angular extent is in the range of 20° to 90°.

18. A tool joint according to claim 17, wherein the second angular extent is 70°.

19. A tool joint according to claim 1, wherein the forward and rear end parts of the male and female threaded portions each have an angular extent in the range of 5° to 30°.

20. A tool joint according to claim 19, wherein the forward and rear end parts of the male and female threaded portions each have an angular extent of 15°.

21. A tool joint according to claim 1, wherein the male member is made of cemented carbide and the female member is made of steel.

22. A tool joint according to claim 1, wherein the thread portion of the male member is ground.

23. A tool joint according to claim 1, wherein the thread portion of the male member and the thread portion of the female member are a single lead threads.

24. A tool joint having an axis A and comprising a male member and a female member;

the male member having an axis B and comprising:
a male body portion; and
a male coupling portion projecting rearwardly from the male body portion, the male coupling portion having an unthreaded forward portion adjacent the male body portion and a rear threaded portion terminating at a rear end;
the threaded portion of the male coupling portion having a thread terminating in a forward end part adjacent the forward portion of the male coupling portion and in a rear end part adjacent the rear end of the rear portion of the male coupling portion, the thread having an intermediate section of uniform depth between the forward and rear end parts;
the forward end part of the thread of the male coupling portion being a thread root having a variable depth gradually decreasing from a depth equal to the uniform depth of the thread to no depth;
the rear end part of the thread of the male coupling portion being a tread crest having a variables height gradually decreasing from a height equal to the uniform depth of the thread to no height;

the female member having an axis C and comprising:
a female body portion; and
a female coupling portion comprising a bore for accepting the male coupling portion, the bore extending rearwardly from a front surface of the female member towards the female body portion, the bore having an unthreaded forward portion adjacent the front surface and a rear threaded portion terminating adjacent the female body portion;
the threaded portion of the female coupling portion having a thread terminating in a forward end part adjacent the unthreaded forward portion of the female coupling portion and in a rear end part adjacent the female body portion, the thread of the female coupling portion having an intermediate section between the forward and rear end parts, the thread of the intermediate section of the female coupling portion having a depth equal to the uniform depth;
the forward end part of the thread of the female coupling portion being a thread crest having a variable height gradually decreasing from a height equal to the uniform depth to no height;
the rear end part of the thread of the female coupling portion being a thread root having a variable depth decreasing from a depth equal to the uniform depth of the thread to no depth;

wherein, upon threaded coupling of the male and female members to form a tool joint connection, the threaded portion of the male member engages the threaded portion of the female member.

25. A tool joint according to claim 24, wherein
the forward end part of the thread of the male coupling portion and the forward end part of the thread of the female coupling portion have a gap between them of a first angular extent (θ2); and
the rear end part of the thread of the male coupling portion and the rear end part of the thread of the female coupling portion have a gap between them of a second angular extent (θ3).

26. A tool joint according to claim 25, wherein the male body portion further comprises a rearwardly facing annular shoulder adjacent the unthreaded forward portion of the male coupling member and the first surface of the female member is a forwardly facing annular shoulder; and wherein, upon threaded coupling of the male and female members to form a tool joint connection, the annular shoulder of the male body portion abuts the annular shoulder of the female body portion.

27. A tool joint according to claim 26, wherein the unthreaded forward portion of the male coupling portion is frustoconical in shape, rearwardly tapering towards the rear threaded portion of the male coupling portion and the unthreaded forward portion of the bore of the female coupling portion is frustoconical in shape, rearwardly tapering towards the female body portion; and wherein, upon threaded coupling of the male and female members to form a tool joint connection, the unthreaded forward portion of the male coupling portion abuts the unthreaded forward portion of the female coupling portion.

28. A tool joint according to claim 27, wherein the male member is a cutting head and the female member is a shank.

29. A tool joint according to claim 28, wherein the cutting head is made of cemented carbide and the shank is made of steel.

30. A male member for a tool joint having an axis B and comprising:

a male body portion; and a male coupling portion projecting rearwardly from the male body portion, the male coupling portion having an unthreaded forward portion adjacent the male body portion and a rear threaded portion terminating at a rear end;

the rear threaded portion having a thread terminating in a forward end part adjacent the forward portion and in a rear end part adjacent the rear end of the rear portion, the thread having an intermediate section of uniform depth between the forward and rear end parts;

the forward end part of the thread being a thread root having a variable depth gradually decreasing from a depth equal to the uniform depth to no depth;

the rear end part of the thread being a thread crest having a variable height gradually decreasing from a height equal to the uniform depth to no height.

31. A male member according to claim 30, wherein the male body portion further comprises a rearwardly facing annular shoulder adjacent the unthreaded forward portion.

32. A male member according to claim 31, wherein the annular shoulder is perpendicular to the axis B.

33. A male member according to claim 31, wherein the annular shoulder is ground.

34. A male member according to claim 31, wherein the unthreaded forward portion is ground.

35. A male member according to claim 30, wherein the unthreaded forward portion is frustoconical in shape, rearwardly tapering towards the rear threaded portion.

36. A male member according to claim 35, wherein the unthreaded forward portion tapers at an angle α1 with respect to the axis B, wherein the angle α1 is in the range of 2.5° to 3.5°.

37. A male member according to claim 30, wherein the forward and rear end parts each have an angular extent in the range of 5° to 30°.

38. A male member according to claim 37, wherein the forward and rear end parts each have an angular extent of 15°.

39. A male member according to claim 30, wherein the male body portion is a cutting head.

40. A male member according to claim 39, wherein the cutting head is made of cemented carbide.

41. A male member according to claim 30, wherein the thread portion is ground.

42. A male member according to claim 30, wherein the threaded portion is a single lead thread.

43. A female member for a tool joint having an axis C and comprising:

a female body portion; and a female coupling portion comprising a bore extending rearwardly from a front surface towards the female body portion, the bore having an unthreaded forward portion adjacent the front surface and a rear threaded portion terminating adjacent the female body portion;

the threaded portion having a thread terminating in a forward end part adjacent the unthreaded forward portion and in a rear end part adjacent the female body portion, the thread having an intermediate second between the forward and rear end parts, the thread of the intermediate section having a depth equal to the uniform depth;

the forward end part of the thread being a thread crest having a variable height gradually decreasing from a height equal to the uniform depth to no height;

the rear end part of the thread being a thread root having a variable depth decreasing from a depth equal to the uniform depth.

44. A female member according to claim 43, wherein the front surface is a forwardly facing annular shoulder.

45. A female member according to claim 44, wherein the unthreaded forward portion of the bore is frustoconical in shape, rearwardly tapering towards the female body portion.

46. A female member according to claim 45, wherein the female body portion comprises a shank for receiving a cutting head to form a cutting tool.

47. A female member according to claim 46, wherein the shank is made of steel.

48. A female member according to claim 46, wherein the unthreaded forward portion tapers at an angle α2 with respect to the axis C, wherein the angle α2 is in the range of 2.5° to 3.5°.

49. A cutting tool assembly comprising a cutting head screw-coupled to a tool shank, wherein:

the cutting head comprises:
a rearwardly projecting coupling portion, the coupling portion having an unthreaded forward portion and a rear threaded portion terminating at a rear end;
the rear threaded portion having a thread terminating in a forward end part adjacent the forward portion and in a rear end part adjacent the rear end, the thread having an intermediate section of uniform depth between the forward and rear end parts;
the forward end part being a thread root having a variable depth gradually decreasing from a depth equal to the uniform depth of the thread to no depth;
the rear end part being a thread crest having a variable height gradually decreasing from a height equal to the uniform depth of the thread to no height; and the tool shank comprises:
a bore extending rearwardly from a front surface of the tool shank, the bore having an unthreaded forward portion adjacent the front surface and a rear threaded portion terminating adjacent a rear end of the bore;
the threaded portion having a thread terminating in a forward end part adjacent the unthreaded forward portion and in a rear part adjacent the rear end, the thread having an intermediate section of uniform depth between the forward and rear end parts;
the forward end part of the thread being a thread crest having a variable height gradually decreasing from a height equal to the uniform depth to no height;

the rear end part of the thread being a thread root having a variable depth decreasing from depth equal to the uniform depth of the thread to no depth.

50. A cutting head having an rearwardly projecting coupling portion, the coupling porting having an unthreaded forward portion and a rear threaded portion terminating at a rear end;

the threaded portion having a thread terminating in a forward end part adjacent the forward portion and in a rear end part adjacent the rear end, the thread having an intermediate section of uniform depth between the forward and rear end parts;

the forward end part being a thread root having a variable depth gradually decreasing from a depth equal to the uniform depth of the thread to no depth;

the rear end part being a thread crest having a variable height gradually decreasing from a height equal to the uniform depth of the thread to no height.

51. A tool shank having a bore extending rearwardly from a front surface thereof, the bore having an unthreaded forward portion adjacent the front surface and a rear threaded portion terminating adjacent a rear end of the bore;

the threaded portion having a thread terminating in a forward end part adjacent the unthreaded forward portion and in a rear end part adjacent the rear end, the thread having an intermediate section of uniform depth between the forward and rear end parts;

the forward end part of thread being a thread crest having a variable height gradually decreasing from a height equal to the uniform depth to no height;

the rear end part of the thread being a thread root having a variable depth decreasing from a depth equal to the uniform depth of the thread to no depth.

* * * * *

UNITED STATES PATENT AND TRADEMARK OFFICE
CERTIFICATE OF CORRECTION

| | | |
|---|---|---|
| PATENT NO. | : 6,485,220 B2 | Page 1 of 1 |
| APPLICATION NO. | : 09/833817 | |
| DATED | : November 26, 2002 | |
| INVENTOR(S) | : Gil Hecht | |

It is certified that error appears in the above-identified patent and that said Letters Patent is hereby corrected as shown below:

Column 5, line 5, the phrase "portion 38" should be --threaded portion 38--

Column 7, line 66, the phrase "the rear portion" should be --the rear threaded portion--

Column 10, line 12, the phrase "the rear portion" should be --the rear threaded portion--

Column 11, line 30, the phrase "of the rear portion" should be --of the rear threaded portion--

Column 12, line 14, the phrase "the thread having an intermediate second" should be --the thread having an intermediate section--

Column 12, line 16, the phrase "a depth equal to the" should be --a depth equal to a--

Signed and Sealed this

Sixth Day of April, 2010

David J. Kappos
*Director of the United States Patent and Trademark Office*